United States Patent [19]
Wilkes et al.

[11] Patent Number: 6,069,183
[45] Date of Patent: May 30, 2000

[54] FOAMABLE COMPOSITION USING HIGH DENSITY POLYETHYLENE

[75] Inventors: Gary R. Wilkes, Saratoga Springs; Ronnie D. Kisner; Jeffrey J. Stimler, both of Queensbury, all of N.Y.

[73] Assignee: Tenneco Packaging Inc., Evanston, Ill.

[21] Appl. No.: 09/056,401

[22] Filed: Apr. 7, 1998

[51] Int. Cl.$^7$ ...................................................... C08L 67/00
[52] U.S. Cl. .............................. 521/139; 79/81; 79/134; 79/98
[58] Field of Search .................................... 521/134, 139, 521/78, 81, 98

[56] References Cited

U.S. PATENT DOCUMENTS

| | | | |
|---|---|---|---|
| 3,432,447 | 3/1969 | Patterson et al. | 260/2.5 |
| 4,255,372 | 3/1981 | Kühnel et al. | 264/54 |
| 4,515,907 | 5/1985 | McCullough et al. | 521/134 |
| 4,644,013 | 2/1987 | Fujie et al. | 521/60 |
| 4,847,150 | 7/1989 | Takeda | 521/81 |
| 5,460,818 | 10/1995 | Park et al. | 426/415 |

FOREIGN PATENT DOCUMENTS

| | | | |
|---|---|---|---|
| 0055460 | 7/1982 | European Pat. Off. | |
| 0 585 147 A1 | 3/1994 | European Pat. Off. | C08J 9/00 |
| 0 647 673 A2 | 4/1995 | European Pat. Off. | C08J 9/14 |

*Primary Examiner*—Morton Foelak
*Attorney, Agent, or Firm*—Arnold White & Durkee

[57] ABSTRACT

A polymeric composition for producing foam in which the polymeric composition comprises high density polyethylene, alkenyl aromatic polymer and, optionally, a resiliency modifier resin. The high density polyethylene is in an amount of from about 45 to about 90 weight percent of the polymeric composition. The high density polyethylene has a z-average molecular weight, $M_z$, greater than about 1,000,000. The alkenyl aromatic polymer is in the amount of from about 3 to about 45 weight percent of the polymeric composition. The resiliency modifier resin is in the amount of from 0 to about 40 weight percent of the polymeric composition. The foam is produced in the absence of a significant amount of a stability control agent.

60 Claims, No Drawings

FOAMABLE COMPOSITION USING HIGH DENSITY POLYETHYLENE

FIELD OF THE INVENTION

The present invention is directed to a polymeric composition for producing foam. Specifically, the polymeric composition comprises a high density polyethylene, an alkenyl aromatic polymer and, optionally, a resiliency modifier resin.

BACKGROUND OF THE INVENTION

Low density foam, such as polystyrene foam, is commonly made by combining a physical blowing agent with a molten polymeric mixture under pressure and, after thorough mixing, extruding the combination through an appropriate die into a lower pressure atmosphere.

From about the 1950's to the present, physical blowing agents of choice have included halocarbons, hydrocarbons or combinations thereof. Examples of these include commercially available halocarbon compositions such as dichlorodifluoromethane, trichlorofluoromethane and mixtures thereof, and the $C_2$–$C_6$ hydrocarbons.

During the 1980's, the worldwide scientific community presented sufficient evidence linking chlorofluorocarbons (CFCs) with atmospheric ozone depletion and sought governments to regulate CFC's. As of a result of such regulations, hydrocarbons are generally the choice of physical blowing agents. Hydrocarbons, especially the short-chained hydrocarbons, produce foams with satisfactory physical properties, but with the adverse effect of flammability. Flammability of the foam product is typically reduced during an aging process that allows the hydrocarbons to be released. This aging process that reduces the flammability of the foam to a safe level depends on factors such as the rate of release (which is dependent on factors such as the foam structure and the selected blowing agent) and the amount of hydrocarbons or the like initially remaining in the produced foam.

There are two foams which are commonly produced. The first foam is made from polystyrene and the second foam is made from low density polyethylenes (LDPEs). The pure polystyrene foam is too brittle for some applications such as protective packaging which require protection from multiple impacts.

LDPE foams are generally considered to be resilient and non-brittle, which are desirable properties. The LDPE foams, however, have a disadvantage in that a stability control agent (also referred to as a permeation modifier) needs to be added to the polymeric composition to produce a commercially acceptable foam (e.g., a foam that does not change its dimensions significantly over time). The stability control agent, however, has a negative effect on the foam in that it prolongs the retention time of the physical blowing agent in the foam.

The amount of total residual blowing agent in the LDPE foam immediately after its manufacture is typically in the range of from about 5 to about 10 weight percent of the polymeric composition. This amount is dependent upon factors such as the desired density of the foam and the selected blowing agent. This amount of total residual blowing agent generally produces a potentially flammable condition if the foam is located in a confined area. Typically, the aging process for a LDPE foam containing a stability control agent takes from about 14 to about 30 days. The aging process is dependent upon a number of factors including, but not limited to, the density of the foam, the selected blowing agent and storage temperature of the foam.

It is an object of the invention to reduce the flammability of foam associated with blowing agents such as hydrocarbons or some partially fluorinated organic blowing agents in post-production usage applications.

It is another object of the invention to reduce the aging requirement associated with, for example, hydrocarbons or some partially fluorinated organic blowing agents.

It is yet another object of the present invention to reduce the degree of collapse of the produced foam caused by the diffusion of a physical blowing agent(s) from the foam cells after the foam achieves its structural form.

It is a further object of the present invention to produce a foam that can be processed with conventional foaming machinery.

It is yet a further object of the present invention to produce a foam that is light in weight.

Lastly, it is object of the invention to produce a resilient, non-brittle foam structure suitable in applications such as protective packaging of delicate and fragile high surface quality goods.

SUMMARY OF THE INVENTION

The polymeric composition for producing foam of the present invention comprises from about 45 to about 90 weight percent of a high density polyethylene (HDPE), from about 3 to about 45 weight percent alkenyl aromatic polymer and, optionally, a resiliency modifier resin. The HDPE resin has a z-average molecular weight, $M_z$, greater than about 1,000,000. The foam of the present invention is produced in the absence of a significant amount of a stability control agent and, thus, allows for a reduced period of time in the aging process. This reduced aging process enables the foamable structure to enter the marketplace sooner and at a safe flammability level.

DESCRIPTION OF ILLUSTRATIVE EMBODIMENTS

The polymeric mixture or polymeric composition for use in the production of the foam of the present invention comprises high density polyethylene (HDPE) from about 45 to about 90 weight percent, alkenyl aromatic polymer from about 3 to about 45 weight percent, and a resiliency modifier resin from about 0 to about 40 weight percent of the polymeric mixture. The preferred polymeric mixture comprises HDPE from about 45 to less than 70 weight percent, alkenyl aromatic polymer from about 15 to about 25 weight percent, and a resiliency modifier resin from about 10 to about 35 weight percent of the polymeric mixture.

The most preferred polymeric mixture comprises HDPE from about 48 to about 55 weight percent, alkenyl aromatic polymer from about 18 to about 22 weight percent, and a resiliency modifier resin from about 25 to about 35 weight percent of the polymeric mixture. The HDPE resin may also be in the range from greater than 70 weight percent to about 90 weight percent. It is contemplated that more than one HDPE and/or alkenyl aromatic polymer can comprise the respective HDPE and alkenyl aromatic polymer weight percents of the polymeric mixture. For example, two HDPE resins (each 25 weight percent) can be blended to comprise 50 weight percent HDPE of the polymeric mixture.

HDPEs

The high density polyethylene (HDPEs) of the present invention has a specific gravity of from about 940 to about 970 kg/M$^3$, and a z-average molecular weight, M$_z$, greater than about 1,000,000. The M$_z$ preferably is greater than about 1,200,000 and most preferably is greater than about 1,400,000. The z-average molecular weight (M$_z$) is characterized by a concentration of extremely high molecular weight polymer chains (i.e., those near an upper end of the molecular weight distribution).

The HDPE of the present invention generally has a melt flow index (MI) in the range of from about 0.05 to about 2.8 dg/min. as measured by ASTM D1238 (nominal flow rate at 190° C. and 198.2 kPA). In general, the high density ethylene polymer should have a melt flow index of less than about 10 dg/min., and preferably less than is about 3 dg/min.

The preferred HDPE is uncrosslinked and has a specific gravity of from about 943 to about 951 kg/m$^3$, a melt flow index in the range of from about 0.18 to about 0.28 dg/min., a weight average molecular weight, M$_w$, in the range of from about 223,000 to about 233,000, a number average molecular weight, M$_n$, in the range of from about 12,500 to about 16,500, and a polydispersity index, D=M$_w$/M$_n$, in the range of from about 12 to about 20. The polydispersity index that is most preferred is in the range of from about 14 to about 18.

The HDPE of the present invention can be obtained by blending two or more HDPEs. For instance, a HDPE having a M$_z$ of 1,100,000 may be blended with a second HDPE having a M$_z$ of 1,500,000. It is contemplated that the HDPE of the present invention may include a HDPE having a M$_z$ of 800,000 blended with a second HDPE having a M$_z$ of 1,600,000 as long as the composite M$_z$ is greater than about 1,000,000. The most preferred HDPE has a bimodal distribution of molecular weight.

It is contemplated that the HDPE of the present invention may comprise a copolymer of at least 50 mole percent of a ethylene unit and a minor (i.e., less than 50%) proportion of a monomer copolymerizable with the ethylene unit. It is contemplated that the term HDPE of the present invention may also include physical blends of two or more different homopolymers that are classified as HDPEs or physical blends of at least 50 percent by weight of an ethylene homopolymer with another predominately high density polyethylenic copolymer. The physical blends are combined in a dry form after the blend components have previously been polymerized.

Alkenyl Aromatic Polymer

The term "alkenyl aromatic polymer" as used herein includes polymers of aromatic hydrocarbon molecules that contain an aryl group joined to a olefinic group with only double bonds in the linear structure, such as styrene, α-methylstyrene, o-methylstyrene, m-methylstyrene, p-methylstyrene, α-ethylstyrene, α-vinylxylene, α-chlorostyrene, α-bromostyrene, vinyl toluene and the like. Alkenyl aromatic polymers also include homopolymers of styrene (commonly referred to as polystyrene) and also copolymers of styrene and butadiene (commonly referred to as impact polystyrene).

The term "polystyrenic resin" or "polystyrenic material" as used herein includes homopolymers of styrene, and styrene copolymers comprised of at least 50 mole percent of a styrene unit (preferably at least about 70 mole percent) and a minor (i.e., less than 50%) proportion of a monomer copolymerizable with styrene. The term "polystyrenic resin" or "polystyrenic material" as used herein also includes blends of at least 50 percent by weight of the styrene homopolymer (preferably at least about 60 weight percent) with another predominately styrenic copolymer. The physical blends are combined in a dry form after the blends have previously been polymerized.

The polystyrenic resin that can be used in the polymeric mixture can be any of those homopolymers obtained by polymerizing styrene to a weight average molecular weight (M$_w$) of from about 100,000 to about 450,000 (commonly referred to as crystal polystyrene), or can be any of those graft copolymers obtained by polymerizing a blend of polymerized styrene upon a nucleus of styrene-butadiene rubber (SBR) to a weight average molecular weight of from about 100,000 to about 350,000 (commonly referred to as impact polystyrene).

The preferred crystal polystyrenes are uncrosslinked and have a melt flow index of from about 0.5 to about 15.0 dg/min. as measured by ASTM D 1238 (nominal flow rate at 200° C. and 689.5 kPa). The most preferred crystal polystyrene is uncrosslinked polystyrene having a melt flow index of from about 2.0 to about 8.0 dg/min.

Impact polystyrenes are generally classified as medium impact polystyrene (MIPS), high impact polystyrene (HIPS) or super high impact polystyrene (S-HIPS). The butadiene level of the impact polystyrene is preferably in the range from about 3 to about 10 weight percent of the copolymer (butadiene and polystyrene). The most preferred butadiene level is in the range of from about 5 to about 8 weight percent of the copolymer. The impact polystyrene generally has a melt flow index of less than about 25 dg/min., and preferably less than about 8 dg/min. The most preferred impact polystyrenes are uncrosslinked HIPSs having a melt flow index of from about 2.2 to about 3.2 dg/min. as measured by ASTM D1238 (nominal flow rate at 200° C. and 689.5 kPa), and a Notched Izod Impact value of from about 9 to about 13 J/m as measured by ASTM D256. The Notched Izod Impact is the energy required to break notched specimens under standard conditions and is work per unit of notch. Therefore, a higher Notched Izod Impact value indicates a tougher material.

The alkenyl aromatic polymer of the present invention can be obtained by blending two or more alkenyl aromatic polymers. For example, blends of crystal polystyrene and impact polystyrenes, such as crystal polystyrene and HIPS, may be blended to comprise the alkenyl aromatic polymer of the present invention.

Resiliency Modifier Resin

The term "resiliency modifier resin" as used herein includes resin or resins having a tactile feel as exemplified in low density foams made from LDPE. This includes, but is not limited to, LDPE, intermediate or medium density polyethylene (MDPE), ethylene ethyl acrylate (EEA), ethylene methyl acrylate (EMA), ethylene acrylic acid (EAA), ethylene methacrylic acid (EMAA), ethylene vinyl alcohol (EVOH), ethylene vinyl acetate (EVA), ionomer and combinations thereof. LDPE is generally defined as an ethylenic polymer having a specific gravity of from about 910 to about 925 kg/m$^3$. MDPEs is generally defined as an ethylenic polymer having a specific gravity between the LDPEs and the HDPEs (i.e., from about 925 to about 940 kg/m$^3$). These resiliency modifier resins are optional in the present invention.

The term LDPE as used herein includes homopolymers of ethylene and copolymers comprised of at least 50 mole percent of a ethylene unit (preferably at least 70 mole percent) and a minor (i.e., less than 50%) proportion of a monomer copolymerizable with the ethylene unit. The term LDPE as used herein also includes physical blends of two or more different homopolymers that are classified as LDPEs or physical blends of at least 50 percent by weight of an ethylene homopolymer (preferably at least about 60 weight percent) with another predominately low density polyethylenic copolymer. The physical blends are combined in a dry form after the resins have previously been polymerized. LDPE is the preferred resiliency modifier resin.

The LDPE resins that can be used in the foamable composition of the present invention include those obtained by polymerizing ethene which is commonly known as ethylene, or polymerizing ethylene with various other polymerizable monomers.

The preferred

The preferred LDPEs are uncrosslinked and have a specific about 915 to about 925 kg/m³, and a melt flow index of from about 0.2 to about 3.8 dg/min. as measured by ASTM D1238 (nominal flow rate at 190° C. and 689.5 kPa). The low density ethylene polymer generally has a melt flow index of less than about 10 dg/min.

It is contemplated that resiliency modifier resins can be obtained by blending two or more resiliency modifier resins. For example, two different LDPE resins may be blended together.

Nucleating Agent

A nucleating agent, or cell size control agent, can be any conventional or useful nucleating agent(s). The amount of cell size agent to be added depends upon the desired cell size, the selected blowing agent, and the density of the polyolefinic composition. The cell size agent is generally added in amounts from about 0.02 to about 2.0 weight percent of the polymeric composition. Some contemplated nucleating agents include inorganic materials (in small particulate form), such as clay, talc, silica, and diatomaceous earth. Other contemplated nucleating agents include organic cell size-controlling agents which decompose or react at the heating temperature within the extruder to evolve gas.

One example of an organic cell size-controlling agent is a combination of an alkali metal salt of a polycarboxylic acid with a carbonate or bicarbonate. Some examples of an alkali metal salt of a polycarboxylic acid include, but are not limited to, the monosodium salt of 2,3-dihydroxy-butanedioic acid (commonly referred to as sodium hydrogen tartrate), the monopotassium salt of butanedioic acid (commonly referred to as potassium hydrogen succinate), the trisodium and tripotassium salts of 2-hydroxy-1,2,3-propanetricarboxylic acid (commonly referred to as sodium and potassium citrate respectively), and the disodium salt of ethanedioic acid (commonly referred to as sodium oxalate) or polycarboxylic acid such as 2-hydroxy-1,2,3-propanetricarboxylic acid. Some examples of a carbonate or a bicarbonate include, but are not limited to, sodium carbonate, sodium bicarbonate, potassium bicarbonate, potassium carbonate, and calcium carbonate.

One contemplated combination is a monoalkali metal salt of a polycarboxylic acid, such as monosodium citrate or monosodium tartrate, with a carbonate or bicarbonate. It is contemplated that mixtures of different nucleating agents may be added in the present invention. Preferred nucleating agents include talc, crystalline silica, and a stoichiometric mixture of citric acid and sodium bicarbonate (the stoichiometric mixture having a 1 to 100 percent concentration where the carrier is a suitable polymer such as low molecular weight polyethylene wax). Talc is preferably added in a carrier, but may also be added in a powder form. The most preferred nucleating agent is crystalline silica at about 18 to about 22 weight percent loading in a LDPE carrier which is added to produce a silica concentration in the foam from about 0.05 to about 0.1 weight percent.

Blowing Agents

It is contemplated that various blowing agents can be used in the present invention, including physical blowing agents such as hydrocarbons. The preferred physical blowing agents for this invention are organic chemical compounds that have boiling points less than about 37° C. These organic compounds include, but are not limited to, fully hydrogenated hydrocarbons and partially fluorinated hydrocarbons which are considered to be flammable. Flammable as defined herein generally includes those materials having flashpoints less than about 37.8° C.

The preferred fully hydrogenated hydrocarbon blowing agents include the initial members of the alkane series of hydrocarbons that contain up to five carbon atoms and which are not regulated by governmental agencies as being specifically toxic to human or plant life under normal exposure. These fully hydrogenated blowing agents include methane, ethane, propane, n-butane, isobutane, n-pentane, isopentane and blends thereof.

The most preferred fully hydrogenated hydrocarbon blowing agent are the $C_2$ to $C_4$ compounds and the blends thereof. An example of a preferred blend is a blend of approximately 67 weight percent n-butane and approximately 33 weight percent isobutane, which is commonly referred to in the industry as A21 butane blend. This blend can be added at a rate of from about 1 to about 20 weight percent of the total extruder flow rate, and preferably added at a rate of from about 3 to about 15 weight percent of the total extruder flow rate.

It is contemplated that auxiliary blowing agents may be used in the present invention in amounts less than about 40 weight percent of the total blowing agent. The preferred auxiliary blowing agent are partially fluorinated hydrocarbon blowing agents that have molecules containing up to three carbon atoms without any other halogen atoms, and those considered flammable. For example, this includes 1,1-difluoroethane (HFC-152a), and 1,1,1-trifluoroethane (HFC-143a), with the most preferred auxiliary blowing agent being HFC-152a. It is also contemplated that 1-1-chlorofluoroethane (HFC-142b) and 1-1-dichloro-2-fluoroethane (HFC-141b) may be added as auxiliary blowing agents for non-regulated insulation applications.

In addition, water may optionally be added at a low concentration level as an auxiliary blowing agent. In addition to functioning as an auxiliary blowing agent, water also functions as a suppressant for fire at the die area of the extruder. The water quality should be at least adequate for human consumption. Water containing a high level of dissolved ions may cause excessive nucleation, so therefore deionized water is preferred. The preferred rate for water addition is from about 0.05 to about 0.5 parts water to 100 parts of the polymeric mixture (0.05 to 0.5 phr). The most preferred rate of adding water is from about 0.2 to about 0.3 phr.

Lastly, it is contemplated that other additives may be added to the foamable composition, including, but not limited to, antistatics, coloring agents, fire retardants, antioxidants, and plasticizers.

The Foamed Product

The thermoplastic polyolefinic cellular materials produced with the invention composition are generally of a density from about 10 kg/m³ to about 150 kg/mr³. These polyolefinic cellular materials have properties that are similar to those found in LDPE foams in the art. The polyolefinic cellular materials of the present invention are produced with consistently uniform physical properties. The polyethylenic cellular materials are light in weight and can be used as protective or cushioning packaging for delicate goods such as computers, glassware, televisions, furniture, and any article that needs to be protected from gouging, surfacescratching or marring. Other contemplated applications for the polyethylenic cellular materials of the present invention include uses in insulation, toys, floatation foam (e.g., life jackets) and recreational parts.

When producing polyolefinic foams having a density less than about 150 kg/cm$^3$, a physical blowing agent, such as a hydrocarbon, is typically added at a rate of from about 7 to about 20 parts by weight to 100 parts of polymeric mixture. The amount of total residual blowing agent in the present invention which remains in the polyolefinic foam immediately after formation (i.e., at the end of the production line) is less than about 3 weight percent. The residual blowing agent is determined by gas chromatography. It is preferred that the amount of total residual blowing agent which remains in the foam is less than about 1.5 weight percent and preferably less than about 1 weight percent. The polyolefinic foam is essentially a blend of HDPE, an alkenyl aromatic polymer and, optionally, a resiliency modifier resin.

The polyolefinic foam of the present invention is preferably a thin cross-section. The term "thin cross-section" as used herein is defined as a dimension in the thickness direction of the foamed structure that is less than about 13 mm. The preferred dimension in the thickness direction of the present invention is from about 0.5 to about 13 mm. It is contemplated, however, that the polyolefinic foams of the present invention may have thicker cross-sections.

The foam of the present invention is "dimensionally" stable. Dimensional stability as defined herein is when the volume of the foam does not either deviate more than about 15 volume percent (i.e., does not either shrink more than about 15 volume percent or expand more than about 15 volume percent) from the volume of the polyolefinic foam at the time of production. The volume of the polyolefinic foam at the time of production is measured within about 15 minutes, and preferably within 10 minutes, after the foam exits the die. This measurement is used in determining the "fresh" density of the foam. To have a dimensionally stable product, the foam is typically measured after aging process for LDPEs (from about 14 to about 30 days) and compared to its fresh volume. It is recognized, however, that in the unlikely event that the foam at a later duration is not within about 15 volume of its fresh volume, then it is not a dimensionally stable product. It is preferable that the foam does not deviate more than about 10 volume percent from its "fresh" volume.

The foams of the present invention are resilient and non-brittle. The term "brittleness" is defined in the art as being the inverse of toughness. Toughness is the ability of a material to resist breakage or fracture in the presence of an external force, such as compression, flexure or tension. Resiliency and non-brittleness can be characterized by a tensile toughness value.

Tensile toughness is represented by the area under the stress versus strain curve during tension and is measured in units of energy per specific volume (e.g., MJ/m$^3$ in SI units). The actual tensile toughness value for a given material structure is obtained by rigorous integration of the area under the stress versus strain curve.

In foams made from conventional extrusion processes, tensile toughness values in the machine direction are generally at least one and one-half times greater than the tensile toughness values in the cross-machine direction. The cross-machine direction (CMD) tensile toughness of the foam is greater than about 33 KJ/m$^3$. The preferred CMD tensile toughness is greater than about 40 KJ/m$^3$, while the most preferred CMD tensile toughness is greater than about 50 KJ/m$^3$.

A Process of the Present Invention

According to one embodiment of the present invention, the process begins by loading pellets of a HDPE, an alkenyl aromatic polymer, and optionally an resiliency modifier resin(s) in their solid form into an extrusion hopper. The HDPE comprises from about 45 to about 90 weight percent of the polymeric mixture. The alkenyl aromatic polymer comprises from about 3 to about 45 weight percent of the polymeric mixture. The polymeric mixture, along with about 0.1 to about 2.0 weight percent loading of pellets of 20% silica compounded in polyethylene (the nucleating agent), are fed by gravity into a extruder. The polymeric-silica mixture is conveyed through the feed zone of the extruder and heated at a temperature sufficient to form a polymeric-silica blend.

A physical blowing agent is added at the injection port area of the extruder in an appropriate ratio to the target density. The polymeric-silica blend and the selected blowing agent are thoroughly mixed within the extruder in the mixing zone, and subsequently cooled in a cooling zone. The cooled polymeric-blowing agent blend is extruded through a die (a die appropriate to the desired product form) into a lower pressure region, then formed into the desired shape and thereafter cooled by convection with ambient air.

The amount of total residual blowing agent, which remains in the foam product immediately after its manufacture is typically less than about 3.0 weight percent of the foam product as determined by gas chromatography.

The foam of the present invention is made in the absence of a significant amount of a stability control agent or permeation modifier. Some examples of stability control agents include, but are not limited to, the partial ester of a long chain fatty acid and a polyol, such as glycerol monostearate; certain borate or phosphinate glycol ester compounds such as tri(1-stearyl-glycero)borate, tri (monostearylpolyoxyethyleneglycol) borate, di(1-stearylglycero) phosphinate; saturated higher fatty acid amides; saturated higher aliphatic amines and complete esters of saturated higher fatty acids, such as stearamide; N-higher aliphatic hydrocarbyl substituted amide of a $C_1$ to $C_8$ aliphatic carboxylic acid such as N-stearyl acetamide or N-stearyl caprylamide; certain higher aliphatic hydrocarbyl ether, ester or anhydride compounds such as behenic anhydride, distearyl ether, distearyl thioether, stearyl laurate and stearyl thiolaurate; certain naphthyl amine compounds such as N,N'-di-beta-naphthyl-paraphenylenediamine or N,N'-di-beta-naphthyl-paradiphenylenediamine, and glycerol monoester of a $C_{20}$–$C_{24}$ fatty acid. The foam of the present invention is preferably made in the complete absence of a stability control agent.

EXAMPLES

Preparation of Inventive Example 1

Pellets of Fina 2804 high density polyethylene (HDPE) (specific gravity of 0.946 g/cm$^3$; melt index [MI] of 0.23 dg/min.; $M_z$ of 1,500,000; and D=16.0), pellets of BASF 158L KG2 Crystal Polystyrene (specific gravity of 1.05 g/cm$^3$; and a MI of 2.5 dg/min.), and pellets of Millennium Petrothene® NA951-000 low density polyethylene (LDPE) (specific gravity of 0.919 g/cm$^3$; and a melt index of 2.3 dg/min.) were prepared in a weight ratio of 50:20:30. These pellets were mixed with 0.35 parts per hundred parts polymer of Schulman F20V crystalline silica concentrate based in LDPE, and heated in a 48:1 L:D NRM 4.5 inch (114.3 mm) single-screw extruder operating at a screw speed of about 71 rpm to form a blend. Pressurized commercial-grade, A21 butane blend (13.1 MPa) was injected at a rate of 39.5 kg/hr.

Pressurized city-supplied water (13.1 MPa) was injected at a rate of about 0.45 kg/hr. The blend, A21 butane and the water were thoroughly mixed within the extruder in the mixing zone. Subsequently, the extrudate was cooled to a melt temperature of about 137° C. at 8.27 MPa. The head pressure of the extruder was regulated by adjusting the extruder screw speed using a Normag 2200 gear pump control system. A melt pump increased the pressure of the extrudate to about 13.4 MPa for delivery at 236 kg/hr into the die.

Preparation of Inventive Example 2

Pellets of Fina 2804 HDPE (specific gravity of 0.946g/cm$^3$; MI of 0.23 dg/min.; $M_z$ of 1,500,000; and D=16.0), pellets of BASF 158L KG2 Crystal Polystyrene (specific gravity of 1.05 g/cm$^3$; and a MI of 2.5 dg/min.) and pellets of Westlake LDPE 606 (specific gravity of 0.918 g/cm$^3$; and a MI of 2.0 dg/min.) were prepared in a weight ratio of 50:20:30. These pellets were mixed with 0.22 parts per hundred parts polymer of Schulman F20V crystalline silica concentrate based in LDPE, and heated in a 32:1 L:D Berlyn 2.5 inch (35.3 mm) single-screw extruder operating at a screw speed of about 30 rpm to form a blend. Pressurized commercial-grade, A21 butane blend (22.1 MPa) was injected at a rate of 5.9 kg/hr.

Pressurized deionized water (22.1 MPa) was injected at a rate of about 0.1 to 0.15 kg/hr. The blend, A21 butane blend and the water were mixed and further heated to a melt temperature of about 227° C. and pressurized to 13.8 MPa at the extruder discharge. The heated mixture was then transferred through a heated pipe to a second, larger 3.5-inch (89 mm) single screw cooling extruder. Thus, Example 2 was run on a tandem extrusion system. Subsequently, the extrudate was cooled to a melt temperature of about 137° C. at 7.0 MPa. The head pressure of the extruder was regulated by a Normag 2200 gear pump control system. A melt pump increased the pressure of the extrudate to about 7.43 MPa for delivery at 37 kg/hr into the die.

Preparation of Inventive Example 3

This Example used the same HDPE and LDPE pellets as described above in is Example 1. The pellets of BASF 158L KG2 Crystal polystyrene were replaced by Fina 825E High Impact Polystyrene (specific gravity of 1.04 g/cm$^3$; and a MI of 3.0 dg/min.). The extrusion was accomplished on a smaller model of the extended single screw foam extruder like that of Example 1. These pellets were mixed in a weight ratio of 50:20:30, and then mixed with 0.16 weight percent Schulman F20V crystalline silica concentrate to form a blend. The blend was heated in a 48:1 L:D Wilmington 3-inch (76 mm) single-screw extruder operating at a screw speed of 30 to 31 rpm. The A21 butane blend and the water were incorporated at the same levels as in Example 2.

The blend, A21 butane blend and water (extrudate) were cooled to a melt temperature of about 137° C. at 7.0 MPa. The head pressure of the extruder was regulated by a Normag 2200 gear pump system. A melt pump increased the pressure of the melt to 7.43 MPa for delivery at 37 kg/hr into the die.

Preparation of Inventive Example 4

The conditions of Example 3 were repeated, except the HDPE/HIPS/LDPE resin blend ratio of Example 3 was changed from 50:20:30 to 50:10:40.

Preparation of Inventive Example 5

The conditions of Example 3 were repeated, except the HDPE/HIPS/LDPE resin blend ratio was changed from 50:20:30 to 70:20:10.

Preparation of Inventive Example 6

The conditions of Example 3 were repeated, except that the HDPE/HIPS/LDPE resin blend ratio was changed from 50:20:30 to 80:10:10.

Preparation of Inventive Example 7

The conditions of Example 2 were repeated, except that the Fina 2804 HDPE resin was replaced with Fina 2344 HDPE resin (specific gravity of 0.946 g/cm$^3$; MI of 0.34 dg/min.; Mz=1,200,000; and D=16.0).

Preparation of Inventive Example 8

The conditions were similar to Example 3, except that Fina 2285 HDPE resin (specific gravity of 0.953 g/cm$^3$, a MI of 0.09 dg/min., a $M_z$ of 1,630,000 and a D of 20.4) replaced the Fina 2804 resin. A foam was difficult to produce because it broke very easily when stretched. Limited samples of the foam were eventually obtained.

Preparation of Inventive Example 9

The conditions of Example 2 were repeated, except that the Westlake 606 LDPE component was eliminated and replaced with an equal amount of Fina 2804 HDPE to obtain a HDPE:HIPS weight ratio of 90:10. The BASF 158L resin was replaced with Fina 825E. The Schulman F20V crystalline silica concentrate was also eliminated.

Preparation of Comparative Example 10

The conditions of Example 3 were repeated, except that Millennium LB5602-00 HDPE resin (specific gravity of 0.951 g/cm$^3$; MI of 0.09 dg/min.; $M_z$ of about 800,000; and D of about 6.6) replaced the Fina 2804 HDPE resin.

Preparation of Comparative Example 11

The conditions of Example 3 were repeated, except that Millennium LS9020-46 HDPE resin (specific gravity of 0.951 g/cm$^3$; MI of 2.3 dg/min.; $M_z$ of about 450,000; and D of about 8) replaced the Fina 2804 HDPE resin.

Preparation of Comparative Example 12

The conditions of Example 11 were repeated, except that one-third of the Westlake 606 LDPE resin was replaced by Dupont Surlyn 9721 (a zinc-based ionomer of ethylene). The HDPE/HIPS/LDPE/ionomer weight ratio was 50:20:20:10.

Preparation of Comparative Example 13

The conditions of Example 2 were repeated on the tandem extrusion system except that Fina 2804 HDPE resin was replaced by Millennium LS9020-46 HDPE (see Example 11 for resin data) and the BASF 158L was replaced by Fina 945E (a super HIPS with a specific gravity of 1.04 g/cm$^3$ and a MI of 3.5 dg/min.).

Preparation of Comparative Example 14

The conditions of Example 2 were repeated, except that the Fina 2804 resin was replaced with Mobil HYA-301 resin (specific gravity of 0.953 g/cm$^3$; MI of 0.34 dg/min.; $M_z$ of about 800,000; and D of about 7.8). The BASF 158L resin was replaced with Fina 825E.

Preparation of Comparative Example 15

This example used only a LDPE resin to produce a foam on the same extrusion system as that of Example 1. Pellets of Westlake 606 LDPE resin of Example 1 were mixed with 0.35 parts per hundred parts polymer of Techmer T-1901 talc concentrate based in LDPE, and heated in a 48:1 L:D (NRM) 4.5-inch (114.3 mm) single-screw extruder operating at a screw speed of about 71 rpm. Pressurized Commercial-grade, A21 butane blend (13.1 Mpa) was injected at a rate of 39.5 kg/hr. Pressurized American Ingredients Company Pationic® 1052 (13.1 Ma), a fatty acid ester product of glycerol, at about 110° C. was injected at a rate of 1.0 kg/hr. The mixture was subsequently cooled to a melt temperature of about 137° C. at 8.27 MPa. The head pressure of the extruder was regulated by a Normag 2200 gear pump control system. The melt pump increased the pressure of the melt to 13.4 MPa for delivery at 236 kg/hr into the die.

Preparation of Comparative Example 16

The conditions were similar to Example 9, except that the Fina 825E high impact polystyrene pellets were then removed from the pellet feed so that only Fina 2804 HDPE pellets were introduced into the extruder. The sheet broke as the change reached the die. The cooled extrudate at the die had a very foamy appearance but, after numerous unsuccessful attempts, the material could not be drawn over the mandrel to produce a foam sheet. This Example did not produce any data and, therefore, was not included in Table 1.

Testing Results

The semi-molten extrudate of each of the Examples was then drawn over a mandrel. Samples of the resulting foam sheets had various properties that are shown in Table 1.

TABLE 1

| EXAMPLE No. | FOAM POLYMER COMPOSITION | Fresh Density (kg/m³) | Fresh Thickness (mm) | Testing Age (days) | Aged Density (kg/m³) | Aged Thickness (mm) | Cell Density (cell/cm) | MD Tensile Toughness (kPa) | CMD Tensile Toughness (kPa) |
|---|---|---|---|---|---|---|---|---|---|
| INVENTIVE FOAMS | | | | | | | | | |
| 1 | 50% Fina 2804 20% BASF 158L 30% Millenium NA951-000 | 21.5 | 2.6 | 14 | 21.9 | 2.6 | 5.5 | 61 | 32 |
| 2 | 50% Fina 2804 20% BASF 158L 30% Westlake 606 LDPE | 21.5 | 2.3 | 16 | 19.1 | 2.6 | 13.4 | 74 | 36 |
| 3 | 50% Fina 2804 20% Fina 825E 30% Westlake 606 LDPE | 22.9 | 2.8 | 15 | 19.9 | 3.0 | 11.0 | 71 | 41 |
| 4 | 50% Fina 2804 10% Fina 825E 40% Westlake 606 LDPE | 22.1 | 3.0 | 15 | 23.4 | 2.8 | 11.0 | 360 | 82 |
| 5 | 70% Fina 2804 20% Fina 825E 10% Westlake 606 LDPE | 24.7 | 2.8 | 15 | 15.4 | 3.1 | 17.3 | 87 | 17 |
| 6 | 80% Fina 2804 10% Fina 825E 10% Westlake 606 LDPE | 21.6 | 2.0 | 14 | 17.8 | 2.2 | 11.8 | 101 | 34 |
| 7 | 50% Fina 2344 20% BASF 158L 30% Westlake 606 LDPE | 21.1 | 3.2 | 19 | 14.1 | 3.1 | 8.7 | 126 | 33 |
| 8 | 50% Fina 2285 20% Fina 825E 30% Westlake 606 LDPE | 20.8 | 3.3 | 15 | 16.5 | 3.8 | 12.6 | 70 | 49 |
| 9 | 90% Fina 2804 10% Fina 825E | 16.8 | 2.1 | 12 | 17.3 | 2.2 | 13.4 | 191 | 85 |
| COMPARATIVE FOAMS | | | | | | | | | |
| 10 | 50% Millenium LB5602-00 20% Fina 825E 30% Westlake 606 LDPE | 22.2 | 3.5 | 14 | 18.1 | 3.1 | 4.7 | 55 | 30 |
| 11 | 50% Millenium LS9020-46 20% Fina 825E 30% Westlake 606 LDPE | 20.2 | 2.4 | 12 | 13.9 | 3.1 | 15.7 | 135 | 19 |
| 12 | 50% Millenium LS9020-46 20% Fina 825E 20% Westlake 606 LDPE 10% Dupont Surlyn 9721 | 21.5 | 3.3 | 12 | 20.2 | 3.3 | 5.5 | 71 | 19 |
| 13 | 50% Millenium LS9020-46 20% Fina 945E 30% Westlake 606 LDPE | 21.1 | 2.0 | 12 | 21.5 | 2.0 | 14.2 | 145 | 17 |
| 14 | 50% Mobil HYA-301 20% Fina 825E 30% Westlake 606 LDPE | 28.8 | 2.0 | 16 | 16.2 | 3.7 | 16 | 119 | 22 |
| 15 | 100% Westlake 606 LDPE | 17.8 | 3.0 | 18 | 18.3 | 2.9 | 7.1 | 221 | 61 |

Inventive Foam 1 had an average fresh density of about 21.5 kg/m³, an average foam thickness of about 2.6 mm, an average linear cell density of about 5.5 cells/cm. The properties of the foam sheet were measured within about 10 minutes of each example after the semi-molten extrudate had exited the die. For Inventive Foam 1 and Comparative Foam 15, 33 samples (3 sets of 11 cross-web samples) were evaluated to obtain the average fresh values. In the remaining examples (Examples 2-14), 4 samples (2 sets of 2 cross-web samples) were evaluated to obtain the average fresh values. Each foam was visually inspected over the next three hours.

As shown in Table 1, the foam in each example was evaluated after different time intervals (see testing age). For instance, Inventive Foam 1 was evaluated after 14 days and had an average aged density of about 21.9 kg/m³, an average foam thickness of about 2.6 mm, and an average cross machine direction (CMD) tensile toughness of 32 kPa. Inventive Foam 1 showed an excellent dimensional stability of 1% ([21.5–21.9]/21.5).

All of the Inventive Foams 1–9, except for Inventive Foam 5, showed an excellent CMD tensile toughness. Surprisingly, most of the Inventive Foams with their excellent CMD tensile toughness were also dimensionally stable even though Inventive Foams 1–9 were made in the absence of a significant amount of a stability control agent.

All of the Comparative Foams with a HDPE resin (Comparative Foams 10–14) did not have a desirable CMD tensile toughness. Comparative Foam 15 (LDPE resin only) did have a desirable CMD tensile toughness and was also dimensionally stable.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A polymeric composition for producing foam, said composition comprising:
   high density polyethylene in the amount of from about 45 to about 90 weight percent of said polymeric composition, said high density polyethylene having a z-average molecular weight, $M_z$, greater than about 1,000,000;
   alkenyl aromatic polymer in the amount of from about 3 to about 45 weight percent of said polymeric composition; and
   optionally, a resiliency modifier resin in the amount of from 0 to about 40 weight percent of said polymeric composition;
   wherein said foam is produced in the absence of a significant amount of a stability control agent.

2. The composition of claim 1 wherein said high density polyethylene is from about 45 to less than 70 weight percent.

3. The composition of claim 1 wherein said high density polyethylene is from greater than 70 weight percent to about 90 weight percent.

4. The composition of claim 2 wherein said high density polyethylene is from about 48 to about 55 weight percent.

5. The composition of claim 1 wherein said alkenyl aromatic polymer is from about 15 to about 25 weight percent.

6. The composition of claim 5 wherein said alkenyl aromatic polymer is from about 18 to about 22 weight percent.

7. The composition of claim 1 wherein said polymeric composition comprises said resiliency modifier resin, said resiliency modifier resin is from about 10 to about 35 weight percent.

8. The composition of claim 7 wherein said resiliency modifier resin is from about 25 to about 35 weight percent.

9. The composition of claim 1 wherein said high density polyethylene is from about 45 to less than 70 weight percent, said alkenyl aromatic polymer is from about 15 to about 25 weight percent and said polymeric composition comprises said resiliency modifier resin, said resiliency modifier resin is from about 10 to about 35 weight percent.

10. The composition of claim 9 wherein said high density polyethylene is from about 48 to about 55 weight percent, said alkenyl aromatic polymer is from about 18 to about 22 weight percent and said resiliency modifier resin is from about 25 to about 35 weight percent.

11. The composition of claim 1 wherein said high density polyethylene has a z-average molecular weight greater than about 1,200,000.

12. The composition of claim 11 wherein said high density polyethylene has a z-average molecular weight greater than about 1,400,000.

13. The composition of claim 1 wherein the polydispersity index, D, of said high density polyethylene is in the range of from about 12 to about 20.

14. The composition of claim 13 wherein said polydispersity index is in the range of from about 14 to about 18.

15. The composition of claim 1 wherein said high density polyethylene has a bimodal distribution of molecular weight.

16. The composition of claim 1 wherein said alkenyl aromatic polymer is a polystyrenic resin.

17. The composition of claim 16 wherein said polystyrenic resin is selected from the group consisting of homopolymers of styrene and copolymers of styrene and butadiene.

18. The composition of claim 1 wherein said resiliency modifier resin is present in said polymeric composition, said resiliency modifier resin is selected from the group consisting of low density polyethylenes, medium density polyethylenes, ethylene ethyl acrylate, ethylene methyl acrylate, ethylene acrylic acid, ethylene methacrylic acid, ethylene vinyl alcohol, ethylene vinyl acetate, ionomer and combinations thereof.

19. The composition of claim 18 wherein said resiliency modifier resin is a low density polyethylene.

20. The composition of claim 1 wherein said foam is produced in the absence of said stability control agent.

21. A process for preparing a thermoplastic polyolefinic cellular material, said process comprising the steps of:
   melting a high density polyethylene, an alkenyl aromatic polymer and, optionally, a resiliency modifier resin to form a polymeric composition, said high density polyethylene being in the amount of from about 45 to about 90 weight percent of said polymeric composition, said high density polyethylene having a z-average molecular weight, $M_z$, greater than about 1,000,000, said alkenyl aromatic polymer being in the amount of from about 3 to about 45 weight percent of said polymeric composition, and said resiliency modifier resin being in the amount of from 0 to about 40 weight percent of said polymeric composition;
   dissolving an effective amount of blowing agent in said polymeric composition to form a blowing-agent-containing polymeric mixture;
   transferring said blowing-agent-containing polymeric mixture to an expansion zone; and
   permitting said blowing-agent-containing polymeric mixture to expand in said expansion zone to produce said thermoplastic polyolefinic cellular material, said thermoplastic polyolefinic cellular material being produced in the absence of a significant amount of a stability control agent.

22. The process of claim 21 further including the step of adding a nucleating agent to said polymeric composition before the step of dissolving said blowing agent in said polymeric composition.

23. The process of claim 22 wherein said nucleating agent is selected from the group consisting of talc, crystalline silica, and a mixture of citric acid and sodium bicarbonate.

24. The process of claim 23 wherein said nucleating agent is crystalline silica.

25. The process of claim 21 wherein said blowing agent is chosen from the group consisting of methane, ethane, propane, n-butane, isobutane, n-pentane, and blends thereof.

26. The process of claim 25 wherein said blowing agent is chosen from the group of n-butane, isobutane and a blend thereof.

27. The process of claim 21 wherein said thermoplastic polyolefinic cellular material is produced in the absence of said stability control agent.

28. A thermoplastic polyolefinic cellular material formed by the process of claim 21.

29. The process of claim 21 wherein said high density polyethylene is from about 45 to less than 70 weight percent.

30. The process of claim 21 wherein said high density polyethylene is from greater than 70 weight percent to about 90 weight percent.

31. The process of claim 29 wherein said high density polyethylene is from about 48 to about 55 weight percent.

32. The process of claim 21 wherein said alkenyl aromatic polymer is from about 15 to about 25 weight percent.

33. The process of claim 32 wherein said alkenyl aromatic polymer is from about 18 to about 22 weight percent.

34. The process of claim 21 wherein said polymeric composition comprises said resiliency modifier resin, said resiliency modifier resin is from about 10 to about 35 weight percent.

35. The process of claim 34 wherein said resiliency modifier resin is from about 25 to about 35 weight percent.

36. The process of claim 21 wherein said high density polyethylene is from about 45 to less than 70 weight percent, said alkenyl aromatic polymer is from about 15 to about 25 weight percent and said polymeric composition comprises said resiliency modifier resin, said resiliency modifier resin is from about 10 to about 35 weight percent.

37. The process of claim 36 wherein said high density polyethylene is from about 48 to about 55 weight percent, said alkenyl aromatic polymer is from about 18 to about 22 weight percent and said resiliency modifier resin polyolefins is from about 25 to about 35 weight percent.

38. The process of claim 21 wherein said high density polyethylene has a z-average molecular weight greater than about 1,200,000.

39. The process of claim 38 wherein said high density polyethylene has a z-average molecular weight greater than about 1,400,000.

40. The process of claim 21 wherein said polydispersity index, D, is in the range of from about 12 to about 20.

41. The process of claim 40 wherein said polydispersity index is in the range of from about 14 to about 18.

42. The process of claim 21 wherein said high density polyethylene has a bimodal distribution of molecular weight.

43. The process of claim 21 wherein said alkenyl aromatic polymer is a polystyrenic resin.

44. The process of claim 43 wherein said polystyrenic resin is selected from the group consisting of homopolymers of styrene and copolymers of styrene and butadiene.

45. The process of claim 21 wherein said resiliency modifier resin is present in said polymeric composition, said resiliency modifier resin is selected from the group consisting of low density polyethylenes, medium density polyethylenes, ethylene ethyl acrylate, ethylene methyl acrylate, ethylene acrylic acid, ethylene methacrylic acid, ethylene vinyl alcohol, ethylene vinyl acetate, ionomer and combinations thereof.

46. The process of claim 45 wherein said resiliency modifier resin is a low density polyethylene.

47. The process of claim 21 further including the step of adding at least one additive to said blowing-agent containing polymeric mixture.

48. The process of claim 47 wherein said at least one additive is selected from the group consisting of antistatics, coloring agents, fire retardants, antioxidants and plasticizers.

49. A thermoplastic polyolefinic cellular material comprising:

a polymeric structure having a cross-machine direction tensile toughness greater than about 33 KJ/m$^3$, said polymeric structure being formed in the absence of a significant amount of a stability control agent, said polymeric structure being essentially a blend of a high density polyethylene, an alkenyl aromatic polymer and, optionally, a resiliency modifier resin, said high density polyethylene being in the amount of from about 45 to about 90 weight percent of said polymeric structure, said high density polyethylene having a z-average molecular weight, $M_z$, greater than about 1,000,000, said alkenyl aromatic polymer being in the amount of from about 3 to about 45 weight percent of said polymeric structure, and said resiliency modifier resin being in the amount of from 0 to about 40 weight percent of said polymeric structure.

50. The material of claim 49 wherein the cross-machine direction tensile toughness is greater than about 40 KJ/m$^3$.

51. The material of claim 50 wherein the cross-machine direction tensile toughness is greater than about 50 KJ/m$^3$.

52. The material of claim 49 wherein the density of said polymeric structure is from about 10 kg/m$^3$ to about 150 kg/m$^3$.

53. The material of claim 49 wherein the cross-section of said polymeric structure is less than about 13 mm.

54. The material of claim 49 wherein said polymeric structure is dimensionally stable.

55. The material of claim 49 wherein said high density polyethylene is from about 45 to less than 70 weight percent.

56. The material of claim 49 wherein said high density polyethylene is from greater than 70 weight percent to about 90 weight percent.

57. The material of claim 55 wherein said high density polyethylene is from about 48 to about 55 weight percent.

58. The material of claim 49 wherein said high density polyethylene has a z-average molecular weight greater than about 1,200,000.

59. The material of claim 58 wherein said high density polyethylene has a z-average molecular weight greater than about 1,400,000.

60. The material of claim 49 wherein said foam is produced in the absence of said stability control agent.

* * * * *

UNITED STATES PATENT AND TRADEMARK OFFICE
CERTIFICATE OF CORRECTION

PATENT NO.: 6,069,183
DATED: May 30, 2000
INVENTOR(S): Wilkes, Kisner, Stimler

It is certified that errors appear in the above-identified patent, and that said Letters Patent is hereby corrected as shown below.

Column 13, Claim 1, line 37, "$M_2$" should be "$M_z$".

Signed and Sealed this

Twenty-fourth Day of April, 2001

Attest:

NICHOLAS P. GODICI

Attesting Officer

Acting Director of the United States Patent and Trademark Office